(12) United States Patent
Griffin et al.

(10) Patent No.: US 7,209,494 B1
(45) Date of Patent: Apr. 24, 2007

(54) DIGITAL REVERSE TRANSMISSION FREQUENCY TRAINING METHOD FOR TIME DIVISION DUPLEX (TDD) COMMUNICATION SYSTEM

(75) Inventors: Dan M Griffin, Bountiful, UT (US); Samuel C. Kingston, Salt Lake City, UT (US); Delon K. Jones, West Bountiful, UT (US); Randal R. Sylvester, West Valley City, UT (US)

(73) Assignee: L-3 Communications Corporation, New York, NY (US)

( * ) Notice: Subject to any disclaimer, the term of this patent is extended or adjusted under 35 U.S.C. 154(b) by 1203 days.

(21) Appl. No.: 09/694,870

(22) Filed: Oct. 24, 2000

(51) Int. Cl.
*H04J 3/06* (2006.01)
(52) U.S. Cl. .................. 370/516; 370/503; 370/507
(58) Field of Classification Search ............... 370/276, 370/277, 280, 294, 310, 342, 343, 347, 464, 370/479, 498, 503, 507, 516, 517
See application file for complete search history.

(56) References Cited

U.S. PATENT DOCUMENTS

| | | | | |
|---|---|---|---|---|
| 5,930,244 A | * | 7/1999 | Ariyoshi et al. ............ 370/335 |
| 5,940,031 A | * | 8/1999 | Turlington et al. ......... 342/372 |
| 5,943,375 A | * | 8/1999 | Veintimilla ................. 375/355 |
| 5,949,794 A | * | 9/1999 | Chiodini ..................... 370/503 |
| 6,064,241 A | * | 5/2000 | Bainton et al. ............. 327/107 |
| 6,269,092 B1 | * | 7/2001 | Schilling ..................... 370/342 |
| 6,473,438 B1 | * | 10/2002 | Cioffi et al. ................. 370/468 |
| 6,529,485 B1 | * | 3/2003 | Agarwal et al. ............ 370/324 |
| 6,539,063 B1 | * | 3/2003 | Peyla et al. ................. 375/267 |
| 6,810,028 B1 | * | 10/2004 | Giallorenzi et al. ........ 370/324 |
| 2002/0118705 A1 | * | 8/2002 | Sezgin et al. ............... 370/503 |
| 2002/0141356 A1 | * | 10/2002 | Beidas et al. ............... 370/324 |

\* cited by examiner

*Primary Examiner*—Huy D. Vu
*Assistant Examiner*—Jason Mattis
(74) *Attorney, Agent, or Firm*—Harrington & Smith, PC

(57) ABSTRACT

A Time Division Duplex (TDD), Code Division Multiple Access (CDMA) communication system includes a plurality of Customer Premises Equipment (CPE) and an Access Point (AP) that communicate through RF links. A CPE contains a receiver baseband subsystem and a transmitter baseband subsystem, and further contains receiver circuitry operable during a receive period for receiving an RF carrier from the AP and for deriving a receiver tracking signal that is indicative of a frequency and phase shift between the received RF carrier and a reference signal. The receiver circuitry further includes a frequency to phase accumulator (FPA) and a digital phase shifter (DPS) for correcting the frequency and phase of a receiver baseband signal by an amount and in a direction indicated by the receiver tracking signal. CPE transmitter circuitry is operable during a next transmission period for operating the FPA and DPS circuitry to correct the frequency of a transmitter baseband signal by an amount indicated by the receiver tracking signal, and in a direction opposite to the direction indicated by the receiver tracking signal.

16 Claims, 2 Drawing Sheets

DIGITAL REVERSE TRANSMISSION FREQUENCY TRAINING METHOD FOR TIME DIVISION DUPLEX (TDD) COMMUNICATION SYSTEM

FIELD OF THE INVENTION

This invention relates generally to Time Division Duplex (TDD) communication systems and, more particularly, relates to TDD communication systems wherein bidirectional digital data links are established between an Access Point (AP) or Hub and a plurality of customer premise equipment (CPE).

BACKGROUND OF THE INVENTION

In a TDD system two entities share a common carrier frequency channel for conducting bidirectional communications. In order to avoid interference and collisions, a first entity transmits during a first time period while a second entity receives the transmission from the first entity, and then the second entity transmits during a second time period while the first entity receives the transmission from the second entity. The first and second time periods are then repeated. In this manner it can be guaranteed that the two entities will not interfere with each others transmissions. Some amount of guard time can be inserted between the first and second periods, and between periods, to ensure that one entity does not begin transmitting before the other finishes.

At the start of a transmission the receiving entity must acquire the received signal, resolve any frequency uncertainty and lock to the carrier frequency and carrier phase, and then begin demodulating the modulated carrier. This can require some significant amount of time. Furthermore, the entire transmission might be missed if the receiver is unable to successfully acquire and lock to the received carrier during the transmission period.

As can be appreciated, it is desirable to provide an ability to make the received signal acquisition and carrier frequency lock processes occur as rapidly as possible. One approach provides a synchronous timing scheme wherein the basic frequency references of both entities are, ideally, identical. For example, the frequency reference of the AP or Hub is declared to be a master frequency reference, and the local frequency references of the CPEs are slaved to the AP frequency reference. Unfortunately, no frequency reference is ideal, and some drift can occur between the various frequency references of the CPEs and the AP. This frequency drift causes a phase and frequency shift between the AP and a receiving CPE, which can lead to received signal demodulation errors.

OBJECTS AND ADVANTAGES OF THE INVENTION

It is a first object and advantage of this invention to provide a method and apparatus for providing an improved received signal acquisition and carrier frequency lock process.

It is another object and advantage of this invention to provide a method and apparatus for use in a communication system that provides an improved received signal acquisition and carrier frequency lock process.

It is a further object and advantage of this invention to provide a method and apparatus for use in a TDD system that pre-corrects a frequency of a transmission from a transmitting entity so as to compensate for a detected amount of frequency error between the transmitting entity and the receiving entity, thereby improving the ability of receiving entity to acquire, lock to, and demodulate the received transmission.

SUMMARY OF THE INVENTION

The foregoing and other problems are overcome and the objects of the invention are realized by methods and apparatus in accordance with embodiments of this invention.

A Time Division Duplex (TDD), Code Division Multiple Access (CDMA) communication system includes a plurality of Customer Premises Equipment (CPE) and an Access Point (AP) that communicate through RF links. A CPE contains a receiver baseband subsystem and a transmitter baseband subsystem, and further contains receiver circuitry operable during a receive period for receiving an RF carrier from the AP and for deriving a receiver tracking signal that is indicative of a frequency and phase shift between the received RF carrier and a reference signal. The receiver circuitry further includes a digital phase shifter and a frequency to phase accumulator that together rotate the receiver baseband signal by some amount of frequency and phase and in a direction indicated by the receiver tracking signal. The CPE further contains, in accordance with an aspect of this invention, multiplexing circuitry for sharing the digital phase shifter and frequency to phase accumulator circuits between the receiver baseband subsystem and the transmitter baseband subsystem. The frequency to phase accumulator is loaded during a next transmission period for operating the digital phase shifter to correct a frequency of a transmitter baseband signal by an amount indicated by the receiver tracking signal, and in a direction opposite to the direction indicated by the receiver tracking signal. The effect is to pre-compensate an RF carrier that is transmitted to the AP from the CPE so as to reduce carrier acquisition time at a receiver of the AP.

The CPE may further contain sample and hold circuitry that is responsive to an end of the receive period for storing the receiver tracking frequency error. This stored frequency error is inverted and loaded into the frequency to phase accumulator which drives the digital phase shifter at the compensated frequency during the next transmission period.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
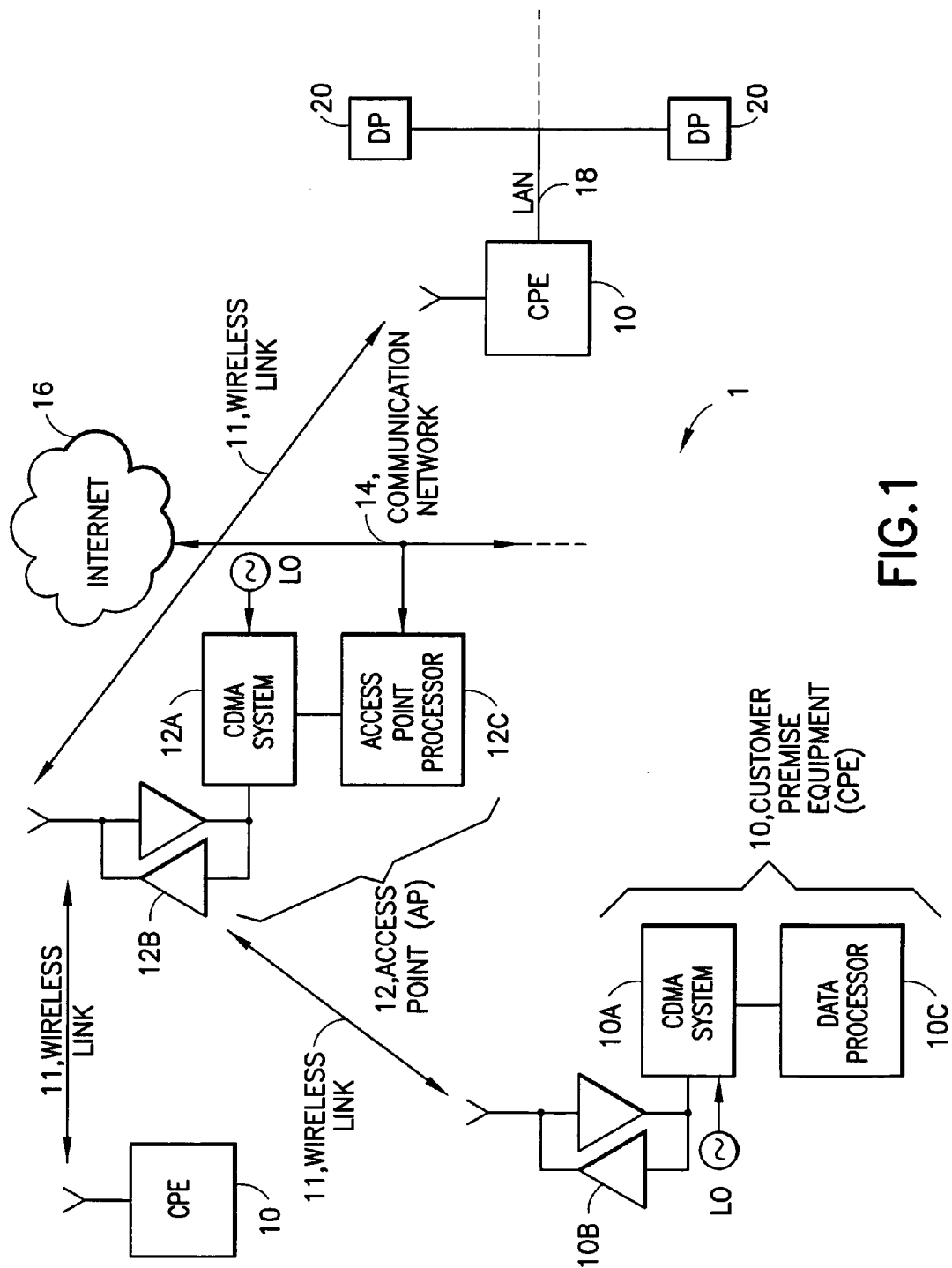
FIG. 1 is simplified block diagram of a TDD communication system having an AP and a plurality of CPEs that is suitable for practicing the teachings of this invention.

FIG. 1 depicts a simplified block diagram of a TDD communication system 1 having an AP 12 and at least one, but preferably a plurality of CPEs 10, and that is suitable for practicing the teachings of this invention. The illustrated and presently preferred embodiment of the TDD communication system 1 operates as a Code Division Multiple Access (CDMA) type system that employs orthogonal codes, such as, but not limited to, Walsh-Hadamard codes, for spreading and despreading the communication signals transmitted between the CPEs 10 and the AP 12 over wireless links (WL) 11. However, other types of access systems may also benefit from the teachings of this invention, including Time Division Multiple Access (TDMA) and combined CDMA/TDMA type systems. In essence, the TDD communication system 10 may be considered to be a variant of a CDMA/TDMA system, as individual ones of the respective time divided transmissions between a given CPE 10 and the AP 12 are made using the CDMA spreading technique, wherein the transmitted waveform is spread over the available bandwidth using one or more properly selected spreading codes. Other types of communications systems may also benefit from the teachings of this invention.

Each CPE 10 is preferably comprised of a CDMA system 10A, assumed to generally include spreaders and despreaders, as well as data phase modulators (transmit), data phase demodulators (receive), frequency reference(s) such as local oscillators (LOs), carrier loop tracking circuits, possibly signal interleavers and deinterleavers, and other circuitry known to those skilled in this art. The CDMA system 10A is, however, modified in accordance with the teachings of this invention in a manner described below. The CDMA system 10A is coupled between a transceiver 10B and a suitable data processor 10C. The transceiver 10B is preferably an RF transceiver providing wireless RF link 11 communication capabilities, preferably but not limited to line of sight (LOS) communication, with a similar RF transceiver 12B of the AP 12. However, in other embodiments the transceivers 10B, 12B may be implemented as optical transceivers.

The data processor 10C could have the functionality of a conventional single user personal computer or workstation, and/or it may serve as a front-end for a local area network (LAN) 18 having a plurality of data processors (DPs) 20 coupled thereto. The exact nature and use of the CPE 10 is not germane to an understanding of the teachings of this invention. It is noted that some or all of the CPEs may also have voice capability (e.g., a microphone and a speaker), and that voice connections can also be made over the wireless links 11.

The Hub or Access Point (AP) 12 is similarly constructed to include a CDMA section 12A, preferably a multi-channel CDMA system for accommodating the plurality of CPEs 10, at least one but preferably a plurality of the transceivers 12B for establishing the wireless links 11 with the CPEs 10, and an Access Point processor 12C for controlling the overall operation of the AP 12. The AP processor 12C is preferably bidirectionally coupled to at least one data communication network 14 which, in turn, can provide access to the Internet and World Wide Web (WWW). In this manner, and by example, one of the DPs 20 can be used to access the WWW via the LAN 18, CPE 10, wireless link 11, AP 12 and the data communication network 14.

During operation, a local oscillator of the AP 12 is preferably frequency and phase synchronous with a local oscillator of the CPE 10. However, some amount of frequency and phase shift between the two LOs will typically be present. A phase shift may also be introduced due to RF channel impairments between the AP 12 and the CPE 10. As such, at least the CPE 10 is provided with carrier loop tracking circuitry (not shown) for frequency and phase locking the local oscillator of the CPE 10 to the incoming received carrier signal from the AP 12.

Figures 2, 3:
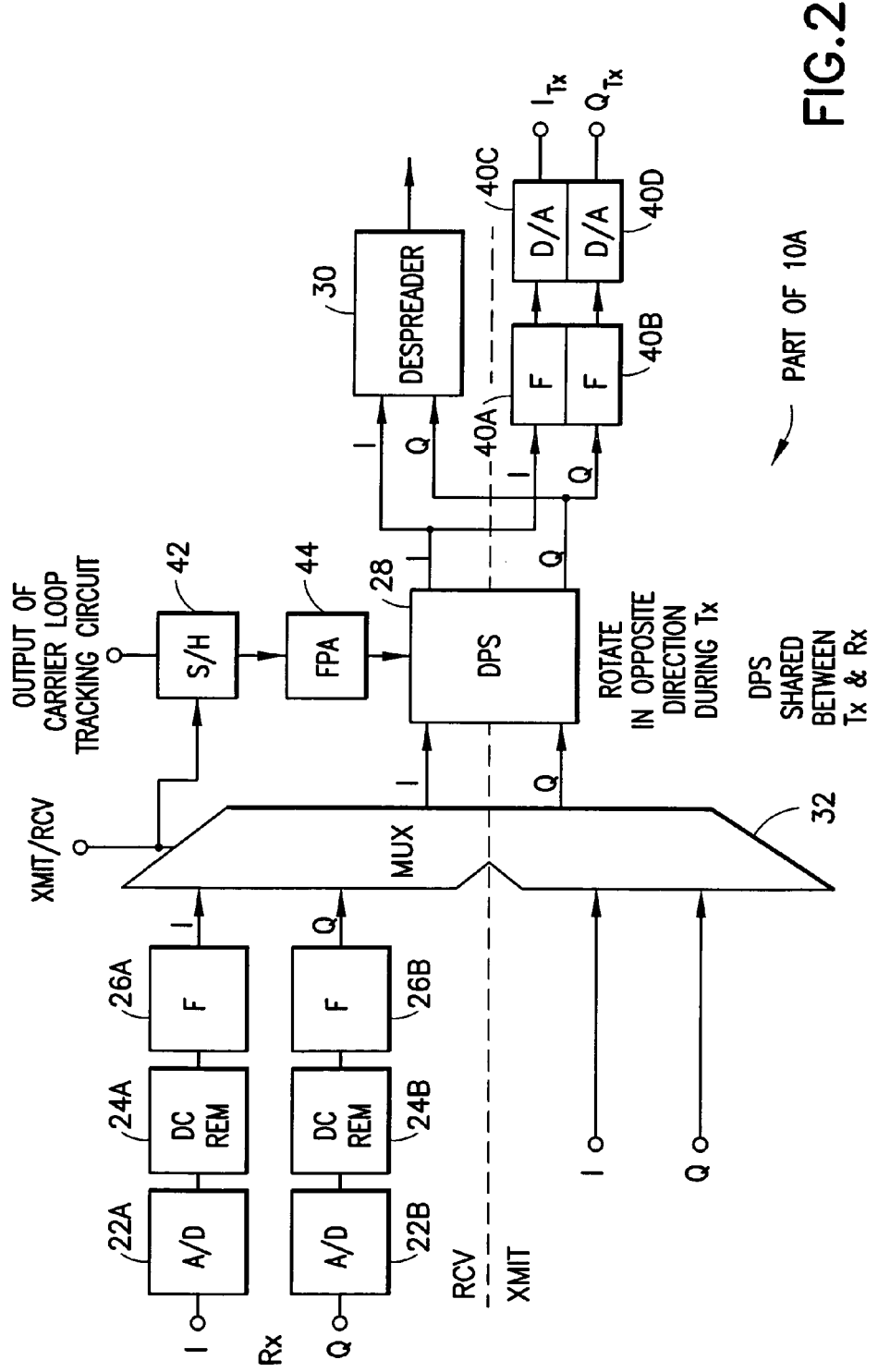
FIG. 2 is a circuit block diagram of a portion of one of the CPEs of FIG. 1, showing circuit components for pre-rotating a phase of a transmission to the AP in accordance with these teachings.
FIG. 3 shows a TDD timing diagram that is useful in explaining the teachings of this invention.

Referring to FIG. 2, there is shown a portion of the CDMA system 10A of one of the CPEs 10. The upper part of the drawing shows a portion of the conventional receiver baseband circuitry or subsystem while the lower part shows a portion of the transmitter baseband circuitry or subsystem, in accordance with these teachings.

Referring first to the upper part of FIG. 2, the receiver (RX) includes Inphase (I) and a Quadrature (Q) baseband channels that are obtained from the RF transceiver 10B. The I and Q channels are essentially mirror images and include an analog to digital (A/D) converter 22A, 22B, DC offset removal circuitry 24A, 24B and (optional) filters 26A, 26B. Conventionally, the outputs of the filters 26A and 26B would be applied to the corresponding I and Q inputs of a digital phase shifter (DPS) 28. The DPS 28, during the receive period, operates to rotate the frequency and phase of the I and Q signals by an amount indicated by the output of a frequency to phase accumulator (FPA) 44. The FPA 44 is driven by an output of a carrier loop tracking circuit. The output of the DPS 28 are signals representing rotated I and Q signals that are applied to a despreader 30 and subsequent baseband circuitry. The despreader 30 is used to extract the CPE's signal from the received signal and to then pass the received signal on to a data decoder and related circuitry.

The FPA 44 basically functions as an accumulator that adds the value output by a sample and hold (S/H) 42 each clock period, thereby changing the phase that the DPS 28 receives each clock to produce a frequency correction. The combination thus corrects for a small frequency error. The frequency generated is given by:

$$fo=((\text{clock frequency})\times S/H \text{ value})/\text{Length of accumulator},$$

e.g., $2^{32}$ if a 32-bit accumulator is used.

In accordance with this invention an input multiplexer (MUX) 32 is provided at the frontend of the DPS 28. The MUX 32 is controlled with a transmit/receive (XMIT/RCV) signal so as to couple, during the TDD receive period and in a conventional fashion, the received baseband I and Q signals to the input of the DPS 28. From the output of the DPS 28 the rotated signals are applied to the despreader 30.

A frequency/phase loop filter that forms a part of the carrier loop tracking circuit contains a measure of the receive frequency error and also the phase error of the received signal. At the end of a receive burst the receive frequency error is held by the sample and hold (S/H) 42, inverted and applied to the frequency to phase accumulator 44. This signal then drives the digital phase shifter 28 to generate a frequency opposite to that of the receive frequency error, thus pre-correcting a transmitted frequency error. As such, when the AP 12 receives the CPE 10 transmission the CDMA system 12A can more rapidly and reliably carrier lock to the received CPE signal, and then despread and demodulate the received signal.

The output of the DPS 28 is provided to I and Q filters 40A, 40B, respectively, and then to transmit path I and Q digital to analog converters (D/As) 40C, 40D, respectively. These signals are subsequently upconverted to the desired transmission carrier frequency.

Referring now as well to FIG. 3, it can be seen that the TDD waveform contains a plurality of transmit periods interspersed with a plurality of receive periods. The transmit and receive periods may or may not be of the same duration. During the receive period the carrier loop tracking circuit is operative to maintain the CPE 10 LO locked to the received carrier. The amount and direction of the frequency shift that is required to be corrected (the amount required to maintain lock) can be indicated by an analog or a digital signal. This signal is then used by the FPA 44 and the DPS 28 as described above.

In accordance with the teachings of this invention the disclosed circuitry of the MUX 32 cooperates with the DPS 28, the frequency to phase accumulator 44, and the output signal (receiver tracking signal) of the carrier loop tracking circuit to correct the frequency of the transmitter baseband I and Q channels.

To facilitate this operation the sample and hold (S/H) circuit 42 can be provided if the output signal of the carrier loop tracking circuit is an analog signal. If the output signal of the carrier loop tracking circuit is instead a digital signal, then the sample and hold function can be implemented with a simple register or with a memory location for storing the last value of the receiver tracking signal during the next transmission period.

In operation, the output signal of the carrier loop tracking circuit is sampled during the receive period and passed through to the frequency to phase accumulator 44. The last frequency-only component of the loop filter is then inverted and held at the end of the receive period or burst. While being held the inverted signal is applied to the frequency to phase accumulator 44, which drives the DPS 28 to create a correction frequency, for the duration of the transmit period. In this manner the amount of frequency correction applied by the DPS 28 to the transmitter baseband I and Q channels, during a single transmission period, is a function of the amount of frequency error detected by the carrier loop tracking circuit at the end of the previous receive period. The use of a single value for the frequency correction during the transmission period is possible since the transmit and receive periods are typically much shorter than the time over which the signal propagation of the RF channel changes, and are also typically shorter than the time over which the CPE 10 LO drifts by a significant amount with respect to the AP 12 LO. In the preferred embodiment of this invention the transmit and receive periods each have a typical duration in the range of about 0.5 milliseconds to about 4 milliseconds, a period of time that is typically much smaller than signal propagation time constants experienced in the RF channel, such as slow fades, which can be seconds and tens of seconds, and is also smaller than the typical (short term) LO drift rate.

The use of this invention enables the AP 12 to more quickly acquire the carrier phase from the CPE 10, as the frequency error has been substantially removed. This enables the transmitted signal to arrive at the AP 12 with little or no frequency ambiguity due to RF channel impairments and frequency-influencing conditions that may exist between the CPE 10 and the AP 12, such as frequency shifts between the CPE 10 and AP 12 LOs. As such, non-coherent clocks may be employed between the CPE 10 and the AP 12, thus simplifying the overall system design and operation.

While the invention has been particularly shown and described with respect to preferred embodiments thereof, it will be understood by those skilled in the art that changes in form and details may be made therein without departing from the scope and spirit of the invention. For example, while FIG. 2 shows the preferred embodiment wherein the DPS 28 is time multiplexed between the transmit and receive channels using the MUX 32, in other embodiments of this invention the MUX 32 could be eliminated, and a second DPS 32 provided in the transmit path. Thus, this invention should not be construed to be limited by only the illustrated and above-described embodiments, but should be given a scope commensurate with the scope of the following claims.

What is claimed is:

1. A method to operate a communication device, comprising:
   during a receive period,
      receiving a first carrier and deriving a receiver tracking signal that is indicative of a frequency shift between the received first carrier and a reference signal; and
      shifting a receiver baseband signal by an amount and in a direction indicated by the receiver tracking signal; and
   during a next transmission period,
      shifting a transmitter baseband signal by an amount indicated by the receiver tracking signal during the receive period, and in a direction opposite to the direction indicated by the receiver tracking signal during the receive period; and
      transmitting a second carrier signal that is modulated in accordance with the shifted transmitter baseband signal, wherein shifting comprises time multiplexing a digital phase shifter circuit between a receiver baseband subsystem and a transmitter baseband subsystem;
   wherein the receiver tracking signal comprises:

$$f_0 = (CF * SH \text{ value})/L;$$

wherein $f_0$ is the receiver tracking signal;
      CF is a clock frequency of a local clock;
      SH value is a value output from the carrier loop tracking circuit; and
      L is a length of an accumulator that stores a plurality of SH values, one from each of a plurality of sequential clock periods.

2. A method as in claim 1, wherein the first carrier and the second carrier each conveys a CDMA communication signal.

3. A method as in claim 1, wherein the communication device comprises a TDD Customer Premises Equipment (CPE), and where the first carrier is received from a transmitter of an Access Point (AP).

4. A method as in claim 1, wherein at the end of the receive period a step is performed of storing the receiver tracking signal for use during the next transmission period.

5. A method as in claim 1, wherein the step of shifting the transmitter baseband signal functions to pre-compensate the transmitted second carrier signal so as to reduce carrier acquisition time at a receiver of the transmitted second carrier signal.

6. A communication device comprising a receiver baseband subsystem and a transmitter baseband subsystem, and further comprising:
   a receiver comprising circuitry that is operable during a receive period for receiving a carrier and for deriving a receiver tracking signal that is indicative of a frequency and phase shift between the received carrier and a reference signal, said receiver further comprising shifting circuitry for rotating the frequency and phase of a receiver baseband signal by an amount and in a direction indicated by the receiver tracking signal; and
   a transmitter comprising shifting circuitry that is operable during a next transmission period for generating a frequency for a transmitter baseband signal that is shifted by an amount indicated by the receiver tracking signal, and in a direction opposite to the direction indicated by the receiver tracking signal, wherein said shifting circuitry of said transmitter and said receiver comprises a frequency to phase accumulator circuit and a digital phase shifter circuit, and circuitry for time multiplexing said frequency to phase accumulator circuit and said digital phase shifter circuit between said receiver baseband subsystem and said transmitter baseband subsystem wherein the receiver further comprises a local clock that defines a clock frequency (CF) and clock period, carrier loop tracking circuitry for outputting on each clock period a frequency change of the carrier, a sample and hold circuit for storing the output of the carrier loop tracking circuitry (SH value) on each clock period, and an accumulator of length L for accumulating sequential SH values, said receiver configured to input the tracking signal $f_0 = (CF*SH\ value)/L$ to the shifting circuitry.

7. A communication device as in claim 6, wherein the carrier conveys a CDMA communication signal.

8. A communication device as in claim 6, wherein said communication device is a TDD communication device and comprises Customer Premises Equipment (CPE), and where the carrier is received from a transmitter of an Access Point (AP).

9. A communication device as in claim 6, and further comprising sample and hold means responsive to an end of the receive period for storing the receiver tracking signal for use during the next transmission period.

10. A Time Division Duplex (TDD) Code Division Multiple Access (CDMA) communication system comprising a plurality of Customer Premises Equipment (CPE) and an Access Point (AP) that communicate through RF links, wherein a CPE comprises a receiver baseband subsystem and a transmitter baseband subsystem and further comprising:
  receiver circuitry operable during a receive period for receiving an RF carrier from the AP and for deriving a receiver tracking signal that is indicative of an error between the received carrier and a reference signal, said receiver circuitry further comprising a digital phase shifter for correcting the frequency and phase of a receiver baseband signal by an amount and in a direction indicated by the receiver tracking signal;
  multiplexing circuitry for sharing said digital phase shifter between said receiver baseband subsystem and said transmitter baseband subsystem; and
  transmitter circuitry operable during a next transmission period for operating said digital phase shifter to correct the frequency of a transmitter baseband signal by an amount indicated by the receiver tracking signal, and in a direction opposite to the direction indicated by the receiver tracking signal, for pre-compensating an RF carrier that is transmitted to said AP so as to reduce carrier acquisition time at a receiver of the AP;

wherein the receiver circuitry further comprises a local clock that defines a clock frequency (CF) and clock period, carrier loop tracking circuitry for outputting on each clock period a frequency change of the carrier, a sample and hold circuit for storing the output of the carrier loop tracking circuitry (SH value) on each clock period, and an accumulator of length L for accumulating sequential SH values, said receiver circuitry configured to input the tracking signal $f_0 = (CF*SH\ value)/L$ to the digital phase shifter.

11. A TDD system as in claim 10, wherein said CPE further comprises a frequency to phase accumulator having an input coupled to receive said receiver tracking signal and an output coupled to a control input of said digital phase shifter.

12. A TDD system as in claim 10, wherein said CPE further comprises a frequency to phase accumulator having an input coupled to receive said receiver tracking signal and an output coupled to a control input of said digital phase shifter, wherein said multiplexing circuitry shares both said frequency to phase accumulator and said digital phase shifter between said receiver baseband subsystem and said transmitter baseband subsystem.

13. A TDD system as in claim 11, wherein said CPE further comprises circuitry responsive to an end of the receive period for storing the receiver tracking signal for use by said digital phase shifter during the next transmission period.

14. A TDD system as in claim 10, wherein said CPE further comprises circuitry responsive to an end of the receive period for storing the receiver tracking signal and for inverting said stored receiver tracking signal for use by said digital phase shifter during the next transmission period.

15. A Time Division Duplex (TDD) Code Division Multiple Access (CDMA) communication system comprising a plurality of Customer Premises Equipment (CPE) and an Access Point (AP) that wirelessly communicate with one another, wherein a CPE comprises receiver baseband means and transmitter baseband means and further comprises:
  a carrier loop tracking circuit;
  a local clock;
  frequency to phase accumulator means, having an input coupled to an output of the carrier loop tracking circuit, operable during a receive period of a carrier from the AP for deriving a receiver tracking signal that is indicative of an error between the received carrier and a reference signal;
  correcting means, having a control input coupled to an output of the frequency to phase accumulator means, for correcting the frequency and phase of a receiver baseband signal by an amount and in a direction indicated by the receiver tracking signal;
  sharing means for sharing said correcting means between said receiver baseband means and said transmitter baseband means, wherein said sharing means shares both said frequency to phase accumulator means and said correcting means between said receiver baseband means and said transmitter baseband means; and
  means operable during a next transmission period for operating said correcting means to vary the frequency of a transmitter baseband signal by an amount indicated by the receiver tracking signal, and in a direction opposite to the direction indicated by the receiver tracking signal, for pre-compensating a transmitted carrier that is transmitted to said AP;

wherein the receiver tracking signal comprises:

$$f_0 = (CF*SH\ value)/L;$$

wherein $f_0$ is the receiver tracking signal;
  CF is a clock frequency of the local clock;
  SH value is a value output from the carrier loop tracking circuit; and
  L is a length of the frequency to phase accumulator means that stores a plurality of SH values, one from each of a plurality of sequential clock periods.

16. A TDD system as in claim 15, wherein said CPE further comprises means, responsive to an end of the receive period, for storing the receiver tracking signal for use during the next transmission period.

* * * * *